3,264,255
COLOR STABILIZATION OF POLYETHYLENE TEREPHTHALATE WITH FINELY DIVIDED METALS
George Wright Taylor, Harrogate, England, assignor to Imperial Chemical Industries Limited, London, England, a corporation of Great Britain
No Drawing. Filed May 3, 1962, Ser. No. 192,061
3 Claims. (Cl. 260—45.75)

This invention relates to improved polyesters with an inhibited tendency to color formation.

I have found that certain metals inhibit degradation, color formation and the evolution of carbonyl compounds such as acetaldehyde, whereas other metals do not have an inhibiting effect and some even have a deleterious effect.

In British Patent 578,079 relating to improvements in the manufacture of highly polymeric substances, it has already been stated that a number of metals are suitable to a varying degree in the preparation of high terephthalate polymers, as catalysts, good results being obtained when using a small amount of an alkali metal, e.g. 0.025 to 0.1%.

According to our invention, fiber forming polyesters derived from terephthalic acid are improved and their tendency to color formation is reduced when the polyesters are subjected to degradation conditions, such as melting and heating at temperatures near and above the melting temperature of the polyester, in the presence of super catalytic amount of metals comprising at least one of the following: nickel, copper, aluminum, manganese and iron, preferably of a particle size greater than 0.25 mm.

The following metals have not been found effective and some had a deleterious effect: zinc, bismuth, vanadium, lead, cobalt, gallium, germanium, silver, molybdenum, magnesium, cadmium, tin and antimony.

Mixtures and alloys of 2 or more of the effective metals may be used and they may be present in finely divided form so as to offer a large surface area but having a particle size preferably greater than 0.25 mm. Conversely the metals may be present in the form of the walls of reaction vessels or apparatus such as stirrers and melt spinning equipment, as well as in the form of relatively large particles such as suitably shaped chips or spheres and so as to become removed by filter packs in melt spinning equipment.

The inhibiting action of my metals should not be confused with the catalytic action of the metals proposed hitherto. It has been established that catalysts to be effective must be soluble in the reaction medium during the polycondensation reaction. Our metals on the other hand may be added and are effective when present in super catalytic amounts, after the polycondensation is completed, and may have a large particle size.

Quantities required, if dispersed in the polymer, exceed those associated with the catalytic amounts proposed, e.g. in British Patent 578,079. Amounts of at least 0.2%, preferably 0.5% and up to 2% by weight of the fiber forming polyester may be used.

It will be appreciated that degradation of the polyesters may be inhibited by the use of apparatus made of or plated with the selected metals which are used when the poylesters require to be maintained at elevated temperatures near to or above the melting temperature, provided that a sufficiently large surface of the polymer is always maintained in contact with the preferred metal, their mixtures or alloys.

Suitable contact may be obtained by maintaining the polymer in motion relative to the preferred metal surface and/or by moving the metal through the molten fiber-forming polymers. This may be done by passing an inert gas through the molten polymer. This causes vigorous agitation.

It should be appreciated that although it is desirable to bring about suitable contact conditions in conventional polymer making and melt spinning equipment certain requirements, which have previously not been realised, should be met, namely that at any given time during which the polyester is heated or maintained above its softening or melting temperature at least 0.2% but preferably 0.5% and more of the metal should be present if desired assisted by adding the metal in a particle size greater than 0.25 mm. and if desired up to 10 mm. in diameter and of such a shape that it may be subsequently removed and recovered easily by filtering. It will be appreciated that there is therefore no upper limit for the amount of metal which may be present, other than practical considerations.

Fibers from polyester of an intrinsic viscosity of between 0.45–0.49 may be improved if it is required to melt spin fiber with a reduced tendency to pilling. For high tenacity fibers with a greater abrasion resistance polyester based on terephthalic acid of I.V. 0.5–0.7 should be inhibited.

Conveniently the metal or metals may be of such a particle size as used in filter packs during melt spinning. Such metal particles can replace the inert glass or sand particles in the filter packs.

Conversely it may be desirable to remove the metal particles from the polymer during melt spinning. This may be done by a suitable filter before the polymer passes through the spinneret. If the metals are added to the polymer, e.g. after completion of the polycondensation reaction it will be desirable to remove the metal, e.g. in the form of large particles from the polymer and to recover the metal, e.g. for re-use before extrusion of the polymer into filaments.

The following examples in which all parts and percentages are by weight, illustrate but do not limit our invention.

EXAMPLE I

Polyethylene terephthalate suitable for melt spinning into filaments was heated for 2 hours at 306° C. and evolving gaseous products were swept out of the reaction zone in a stream of nitrogen which continuously and vigorously agitated the molten polymer. If the molten polyester contained a small percentage by weight of nickel, particles of about 0.25 mm. in diameter, the rate of evolution of carbonyl compound and coloration of the polyester was considerably decreased, as the data in Table I show.

Table I

EFFECT OF NICKEL ON THE RATE OF EVOLUTION OF CARBONYL COMPOUNDS, AND COLORATION IN MOLTEN POLYETHYLENE TEREPHTHALATE

| Nickel Concentration (Wt. percent) on weight of P.E.T. | Rate of Evolution of Carbonyl Compound (moles/ester link/sec. $\times 10^7$) | Colour Formed after 2 hours (arbitrary units) |
|---|---|---|
| 0.0 | 5.5 | 7.8 |
| 0.2 | 2.3 | 6.8 |
| 0.5 | 1.7 | 4.4 |
| 1.0 | 1.2 | 4.4 |

EXAMPLE II

Polyethylene terephthalate was heated as in Example I, but contained 0.5% of aluminum particles instead of nickel. Again, color formation and rate of evolution of carbonyl compound were decreased.

EXAMPLE III

Polyethylene terephthalate was heated as in Example I, but contained 0.5% of a mixture of nickel and aluminum (40 parts nickel, 60 parts aluminum), instead of nickel. Again, color formation and rate of evolution of carbonyl compound were decreased.

EXAMPLE IV

Polyethylene terephthalate was heated as in Example I, but contained 0.5% of copper particles instead of nickel. Again, the rate of evolution of carbonyl compound was decreased.

EXAMPLE V

Polyethylene terephthalate was heated as in Example I, but contained 0.5% of iron instead of nickel. Again, the rate of evolution of carbonyl compound was decreased.

EXAMPLE VI

Polyethylene terephthalate was heated as in Example I, but contained 0.5% of manganese instead of nickel. Again, the rate of evolution of carbonyl compound was decreased.

What is claimed is:

1. A method of reducing degradation and tendency to color formation of fiber forming polyethylene terephthalate formed by a polycondensation reaction when the polymer is subjected to heating at an elevated temperature which comprises adding to said polyethylene terephthalate, after polycondensation, at least about 0.2% of at least one metal selected from the group consisting of nickel, copper, aluminum, manganese, and iron, said metal having a particle size in the range 0.25 to 10 mm., and maintaining said metal in contact with the polymer, while it is heated to a temperature sufficient to cause degradation.

2. A method of reducing degradation and tendency to color formation as set forth in claim 1 in which the amount of said metal is about 0.25 to 2% by weight of said polyethylene terephthalate.

3. A method of reducing degradation as set forth in claim 1 including the steps of melt spinning said polyethylene terephthalate and removing said metal prior to passing the polyethylene terephthalate through a spinneret.

References Cited by the Examiner

UNITED STATES PATENTS 2,764,718   9/1956   Peck et al. _____ 260—40

FOREIGN PATENTS 578,079   6/1946   Great Britain.

OTHER REFERENCES

Hardy: J.S.C.I., 67, November 1948, pages 426–432.

LEON J. BERCOVITZ, *Primary Examiner.*

JOSEPH LIBERMAN, *Examiner.*

T. D. KERWIN, M. J. WELSH, *Assistant Examiners.*